United States Patent [19]

Michael et al.

[11] 4,202,811

[45] May 13, 1980

[54] SILOXANE-EPOXY MOLDING COMPOUND WITH IMPROVED CRACK RESISTANCE

[75] Inventors: Keith W. Michael, Midland; Alvin L. Moore, Clare, both of Mich.

[73] Assignee: Dow Corning Corporation, Midland, Mich.

[21] Appl. No.: 917,618

[22] Filed: Jun. 21, 1978

[51] Int. Cl.$^2$ .................................................. C08L 83/04
[52] U.S. Cl. ............................ 260/37 SB; 260/37 EP
[58] Field of Search ......... 260/37 SB, 37 EP, 824 EP

[56] References Cited

U.S. PATENT DOCUMENTS

| | | | |
|---|---|---|---|
| 3,842,141 | 10/1974 | Fetscher et al. | 260/824 EP |
| 3,971,747 | 7/1976 | Bank et al. | 260/37 SB |
| 4,082,719 | 4/1978 | Liles et al. | 260/37 SB |
| 4,125,510 | 11/1978 | Antonen | 260/37 SB |

OTHER PUBLICATIONS

Lee et al., Handbook of Epoxy Resins, McGraw-Hill, Inc., 1967, p. 16-3.

*Primary Examiner*—Lewis T. Jacobs
*Attorney, Agent, or Firm*—Robert F. Fleming, Jr.; James E. Bittell

[57] ABSTRACT

An improved curable siloxane-epoxy molding composition which is a blend of a phenylpolysiloxane, an aluminum catalyst, a silica filler, and an aromatic polyepoxide resin which contains at least 38 percent by weight of a polydiglycidyl ether of a bisphenol is disclosed. The molding composition has improved thermal shock crack resistance when used to encapsulate electronic devices.

8 Claims, No Drawings

SILOXANE-EPOXY MOLDING COMPOUND WITH IMPROVED CRACK RESISTANCE

BACKGROUND OF THE INVENTION

This invention relates to a curable siloxane-epoxy molding composition with improved crack resistance. In another aspect the invention relates to a method for improving the crack resistance of siloxane-epoxy moldings.

Siloxane-epoxy copolymers and blends are well known for coating, casting, and molding applications. Siloxane-epoxy copolymers formed by the condensation of silanol and hydroxyl groups present in the epoxy resins are described in such patents as U.S. Pat. No. 3,170,962 for use in coatings and castings. The cure of such copolymers is obtained from the reaction of residual epoxy functionality. Siloxane-epoxy blends are known from U.S. Pat. No. 3,368,893 for use as binder resin in zinc oxide containing photoconductive compositions employed in an electrophotographic method of preparing etchable printing plates. The blends were cured by contact with solutions containing aluminum catalyst. Generally, improved properties such as antichalking in coatings, humidity resistance in electrical insulation, and abrasion resistance in binder applications are recognized in the materials.

Both types of siloxane-epoxy materials are also known in molding compositions. In U.S. Pat. No. 3,842,141, siloxane-epoxy copolymers are prepared by heating epoxide resins which contain hydroxyl groups with a silanol containing phenylsiloxane resin in a solvent to effect a silanol-hydroxyl condensation. Water formed by condensation and solvent are removed and the solid copolymer is ground before mixing with other ingredients such as curing agents, release agents, pigments, fillers, and catalysts to obtain a molding compound. Epoxy resins containing hydroxyl functionality such as the polydiglycidyl ether of bisphenol A are employed in the production of copolymers, but such resins as epoxidized novolacs are taught to be inoperable. The cure of such copolymers in molding compounds is obtained from the reaction of residual epoxy functionality with added curing agents such as anhydrides.

Molding compositions based on siloxane-epoxy blends are known from U.S. Pat. No. 3,971,747. In this case a curable molding composition is prepared by mixing an epoxy resin, a silanol containing phenylsiloxane resin, an aluminum catalyst and other ingredients such as release agents, pigments, and fillers. The aluminum catalyst facilitates reaction between the epoxy group and the silanol to effect a cure when the blend is molded and heated. Epoxy resins utilized in blends are not limited to those containing hydroxyl functionality and epoxidized novolacs are employed in the siloxane-epoxy blended molding compounds.

The siloxane-epoxy blended molding compound combines many of the features of siloxane and epoxy resins such as moisture resistance, salt atmosphere resistance, high strength, and strong lead seal. It has been used commercially to encapsulate electronic devices. However, one of the problems with siloxane-epoxy blended molding compounds is the fact that their normal shock crank resistance is not sufficient for some applications. In these applications the electrical device must function in an environment of rapid temperature fluctuations. When the encapsulant on a device cracks, failure of the device often results. Consequently, it is important that the crack resistance of siloxane-epoxy blended molding compounds be improved.

Applicants have discovered that when an automatic polyepoxide resin (D) which has more than one epoxide per molecule, has a Durran's melting point between 60° and 110° C., and has at least 38 weight percent based on the weight of (D) of a polydiglycidyl ether of a bisphenol is employed in a siloxane-epoxy blended molding compound containing silica fillers, improved crack resistance is surprisingly obtained. It is known from the *Handbook of Epoxy Resins\** (Henry, L. and Neville, K., N.Y., McGraw-Hill, Inc., 1967, p. 16-3) that higher molecular weight polydiglycidyl ether of bisphenol A may, under conditions of reaction not leading to reaction through groups other than the epoxy (i.e., hydroxyls), be employed to impart some degree of flexibility to cured systems. Since it is expected that reaction occurs between silanols and hydroxyl groups as well as between silanols and epoxy groups in siloxane-epoxy blends employing polydiglycidyl ether of bisphenol A, it is unexpected that a more flexible or crack resistant cured molding could be obtained.

*Which is hereby incorporated by reference.

It is known from U.S. patent application "Method of Improving the Crack Resistance of Siloxane Molding Compositions" by Robert C. Antonen, Ser. No. 773,364 filed Mar. 1, 1977, and now U.S. Pat. No. 4,125,510, and assigned to the assignee of the present invention, that small amounts of epoxy resins (4 to 15 percent by weight based on the combined weight of silicone and epoxy resin employed) improve the crack resistance of silicone molding compounds. These silicone molding compounds modified with a small amount of epoxy resin are not within the claims of the present invention which require at least 40 weight percent epoxy resin (based on the combined weight of silicone and epoxy resin employed) and which require an aluminum catalyst. Moreover, this reference does not teach or suggest the specific epoxy resin compositions required in the present invention to improve the crack resistance of siloxane-epoxy molding compounds.

BRIEF SUMMARY OF THE INVENTION

This invention relates to an improved curable siloxane-epoxy molding composition which is a blend of (A) 5 to 60 weight percent based on the combined weight of (A) and (D) of a phenylpolysiloxane resin having a degree of substitution of from 1.0 to 1.7, a phenyl to silicon ratio of 0.2 to 1.5, an R to silicon ratio of 0.4 to 1.4 in which R is an aliphatic hydrocarbon radical of 1 to 3 carbon atoms, and a silicon-bonded hydroxyl content of from 2.5 to 10.0 weight percent; (B) 0.1 to 10 weight percent based on the combined weight of (A) and (D) of an aluminum catalyst selected from the group consisting of aluminum acrylates of the formula

in which each R' is independently selected from the group consisting of the hydrogen atom, alkyl radicals containing from 1 to 20 inclusive carbon atoms, and aryl and aryl containing hydrocarbon radicals containing 6 to 24 inclusive carbon atoms and n having a value from 0 to 2 and condensates of such compounds; and (C) 65 to 85 weight percent based on the combined weight of (A), (B), and (D) of a silica filler; wherein the improvement comprises employing as the epoxy ingredient 40 to 95 weight percent based on the combined weight of (A) and (D) of an aromatic polyepoxide resin which has more than one epoxide per molecule, has a Durran's melting point between 60° and 110° C., and is composed of at least 38 weight percent based on the weight of (D) of a polydiglycidyl ether of a bisphenol. This invention also relates to a method of improving the crack resistance of curable siloxane-epoxy molding compositions which are prepared by blending (A), (B) and (C) wherein the improvement comprises adding (D) to the composition.

DETAILED DESCRIPTION OF THE INVENTION

The phenylsiloxane resins employed in this invention are well known articles of commerce. They are composed of copolymers or blends of copolymers of combinations of monophenylsiloxane units, diphenylsiloxane units, phenylmethylsiloxane units, dimethylsiloxane units, monomethylsiloxane units, ethylsiloxane units, phenylethylsiloxane units, diethylsiloxane units, propylsiloxane units, propylmethylsiloxane units, or dipropylsiloxane units having the phenyl to silicon ratio of 0.2 to 1.5 and an alkyl group to silicon ratio of 0.4 to 1.4 with a combined degree of substitution of from 1.0 to 1.7. These resins contain 2.5 to 10 weight percent of silicon-bonded hydroxyl and may contain small amounts of $R''_3SiO_{0.5}$ units where $R''$ is phenyl, methyl, ethyl or propyl.

Catalysts (B) employed to cure the compositions of this invention are aluminum acylates and condensates of aluminum acylates which are known for curing siloxane-epoxy blended molding compositions. The aluminum acylates include aluminum triacylates, such as aluminum triacetate, aluminum tributyrate, aluminum tribenzoate, aluminum tristearate, aluminum-diacetate-monostearate, and aluminum tri(3-methylbenzoate). Also included are the hydroxylated or alkoxylated aluminum acylates such as aluminum hydroxy distearate, aluminum monoisopropoxide dibenzoate, aluminum dihydroxy monobutyrate, and aluminum diethoxide mono(3-methylbenzoate). The condensates of aluminum acylates include dimers, trimers, and cyclic polymers which retain acyloxy functionality such as

If desired the aluminum acylate catalyst can be formed in situ by adding an inactive compound, such as aluminum lactate, aluminum borate, or aluminum phenoxide and a carboxylic acid, such as stearic acid or benzoic acid to the reactant mixture. A preferred catalyst for the present invention is aluminum tribenzoate.

The fillers (C) used in the compositions of this invention are silica fillers such as crushed amorphous silica, crushed crystalline silica, fume silica, and glass. These materials can be particulate, fibrous, or a combination of both particulate and fibrous fillers. The absolute crack resistance of siloxane-epoxy molding compounds varies with the silica filler employed such that amorphous silica filled compositions usually are more crack resistant that crystalline silica filled compositions. In a preferred embodiment of the present invention, crushed crystalline silica is employed in a molding composition with improved crack resistance that has higher thermal conductivity and is more economical than a similar composition filled with crushed amorphous silica.

The aromatic polyepoxide resins (D) employed in this invention are polydiglycidyl ethers of bisphenols or mixtures of at least 38 percent by weight based on the total weight of (D) of the above polydiglycidyl ethers of bisphenols with other epoxidized polyphenols. The polydiglycidyl ethers of bisphenols are the well known reaction products of bisphenols and halogenated bisphenols with epihalohydrins, and include such products as polydiglycidyl ether of bisphenol A, polydiglycidyl ether of bisphenol F, and diglycidyl ether of tetrabromobisphenol A. Epoxidized polyphenols that may be employed in the present invention have more than one epoxide per molecule such as polyglycidyl ether of novolac, polyglycidyl ether of o-cresol novolac, and polyglycidyl ethers of triphenols, pentaphenols, or heptaphenols such as those described in U.S. Pat. No. 2,885,385 which is incorporated herein by reference. Suitable resins (D) for the present invention have a melting point between 60° and 110° C. as measured by Durran's mercury method.

In one embodiment of the invention, the polyepoxide resin (D) employed consists essentially of polydiglycidyl ethers of bisphenols. In a preferred embodiment of the invention the polyepoxide resin (D) consists essentially of 80 to 95 percent by weight of polydiglycidyl ether of bisphenol A and 5 to 20 percent by weight of polydiglycidyl ether of brominated (ring substituted) bisphenol A. These compositions are preferred for their improved fire resistance which is contributed by the brominated compound.

In order to prepare the molding compositions of this invention, 5 to 60 weight percent of siloxane resin (A) and 40 to 95 weight percent of epoxy resin (D) based on the total weight of (A) and (D) are mixed with 65 to 85 weight percent based on the combined weight of (A), (C), and (D) of silica filler (C) and 0.1 to 10 weight percent based on the combined weight of (A) and (D) of aluminum catalyst (B). The materials may be mixed in any convenient manner such as milling or blending of the solid powders. The ingredients may also be mixed at a somewhat elevated temperature but such temperature should not be so high that significant cure of the composition occurs. The order of mixing of the ingredients is not important.

The compositions can be molded to a desired shape by heating 1 to 2 minutes at 175° C. at a pressure of 500 to 1000 psi. If desired, the compositions may be post cured at 150° to 200° C. for from 2 to 6 hours in order to develop maximum strength.

If desired, additives such as pigments, thickening agents, flame retardants, oxidation inhibitors, mold release agents, etc. can be employed in small amounts along with the essential ingredients in the compositions of this invention.

The following examples are illustrative only and should not be construed as limiting the invention which is properly delineated in the appended claims.

Example 1

This example shows the effect of varying the amount of polydiglycidyl ether of bisphenol type epoxy resins while maintaining the ratio of total epoxy resin to silicone resin constant at 3.16 to 1.

Silicon resin (1) employed in this example was a copolymer of 45 mole percent monomethylsiloxane, 40 mole percent monophenylsiloxane, 10 mole percent diphenylsiloxane, and 5 mole percent phenylmethylsiloxane. This copolymer contained about 5.0 percent by weight silicon-bonded hydroxyl groups.

The epoxy resins employed were (2) a polyglycidyl ether of a cresol novolac having a molecular weight of about 1170 and epoxide equivalent weight of 230, a Durran's melting point of 78°–81° C., (3) a polydiglycidyl ether of bisphenol A having an epoxide equivalent weight of 475 to 575, a Durran's melting point of 70°–80° C., and (4) a polydiglycidyl ether of brominated (ring substituted) bisphenol A having an epoxide equivalent weight of 450, a Durran's melting point of 60° C., and containing 50 percent by weight bromine. Formulations (a) through (f) were prepared by varying the weight ratio of epoxy resin (2) and (3) in the total epoxy resin mixture. The combined weight percents of bisphenol based epoxy resins (3) and (4) in the total epoxy resin employed are shown in Table I below.

Ingredients, expressed in percent by weight based on the weight of the total composition, were blended on a two roll mill with one roll heated to 200° F. Each formulation contained 6 percent resin (1), 17.5 percent epoxy resin (2) plus (3), 1.5 percent epoxy resin (4), 0.125 percent lampblack, a pigment, 0.5 percent $Sb_2O_3$, a flame retardant, and in formulation (a) 74.28 percent of a 325 mesh crystalline silica, in formulations (b) through (e) 74.37 percent crystalline silica, and in (f) 73.78 percent crystalline silica and 0.5 percent thickening agent. Also employed in formulation (a) and (f) was 0.094 percent low viscosity trimethylsiloxy endblocked polymethylhydrogensiloxane to improve lead seal.

To these formulations was added 0.51 to 1.02 percent aluminum tribenzoate, 0.83 to 1.70 percent Carnauba wax, and 0.23 percent calcium stearate (mold release agent) as shown in the table below where the percents indicated are based on the combined weights of resin (1), (2), (3) and (4).

The crack resistance of each formulation was determined by encapsulating integrated circuit frames with the formulation by molding 2 minutes at 175° C. at 800 p.s.i. and then post curing each encapsulated circuit 4 hours at 175° C. Each encapsulated circuit was checked for crack resistance according to Mil Standard 883A Method 1010.1 Condition C. The percent of good devices after 10 test cycles is shown for each formulation.

Table I

| | Aluminum Benzoate | Carnauba Wax | Weight Percent Bisphenol Based Epoxy Resin in the Total Epoxy Resin | Percent Good Devices |
|---|---|---|---|---|
| a | 1.02 | 0.83 | 100 | 100 |
| b | .82 | 1.39 | 47.9 | 85 |
| c | .78 | 1.49 | 38 | 75 |
| d | .74 | 1.60 | 27.9 | 45 |
| e | .70 | 1.70 | 18.4 | 20 |
| f | .51 | .83 | 7.9 | 10 |

Example 2

This example shows the effect of varying the amount of polydiglycidyl ether of bisphenol type epoxy resin while maintaining the ratio of total epoxy resin to silicone resin constant at 13.2 to 1.

Silicone resin (1) and epoxy resins (2) and (3) employed herein were those used in Example 1. The brominated epoxy resin (5) employed in this example was a polydiglycidyl ether of brominated (ring substituted) bisphenol A having an epoxide equivalent weight of 675, a Durran's melting point of 95° C., and containing 42 percent bromine. Several formulations were prepared with varying amounts of the polydiglycidyl ether of bisphenol type resins as shown in Table II below.

Ingredients are expressed in percent by weight based on the weight of the total composition. In each case the formulation employed was 1.76 percent resin (1), 20.24 percent resins (2) plus (3), 3.0 percent resin (5), 72.975 percent crystalline silica, 0.125 percent lampblack, 0.9 percent $Sb_2O_3$, and 1.0 percent thickening agent. To this formulation was added 1.7 percent aluminum tribenzoate, 1.7 percent Carnauba wax, and 0.2 percent calcium stearate all based on the combined weights of silicone and epoxy resins.

Each sample was employed to encapsulate integrated circuit frames as shown in Example 1. The encapsulated frames were subjected to the crack testing of that example and the results are shown in Table II.

Table II

| Weight Percent Bisphenol Based Epoxy Resin in the Total Epoxy Resin | Percent Good Devices |
|---|---|
| 47.9 | 90% |
| 41.3 | 70% |
| 36.6 | 10% |

Example 3

This example shows the effect of varying the amount of silicone resin employed.

Silicone resin (1) and epoxy resins (3) and (5) employed in this example were those used in Example 2. Several formulations were prepared with varying proportions of the three resins as shown in Table III. In each case the formulation employed 25 percent combined resins (1), (3), and (5), 72.975 percent crystalline silica, 0.125 percent lampblack, 0.9 percent $Sb_2O_3$, and 1.0 percent thickening agent where ingredients are expressed in percent by weight based on the weight of the total composition. To this formulation was added 1.7 percent Carnauba wax, 0.2 percent calcium stearate, and 0.6 to 1.7 percent by weight aluminum tribenzoate all based on the combined weights of silicone and epoxy resins as shown in Table III.

Each sample was employed to encapsulate integrated circuit frames as shown in Example 1. The encapsulated frames were subjected to the crack testing of Example 1. The results are shown in Table III.

Table III

| | Percent of Resin Component | | | |
|---|---|---|---|---|
| Silicone Resin (1) | Epoxy Resin (3) | Epoxy Resin (5) | Aluminum Benzoate Percent | % Devices Good |
| 65 | 27 | 8 | 1.5 | 59 |
| 60 | 32 | 8 | 1.0 | 74 |
| 40 | 48 | 12 | 0.6 | 100 |
| 10 | 78 | 12 | 1.2 | 100 |
| 7.52 | 80.48 | 12 | 1.7 | 100 |

Example 4

This example shows the improved crack resistance of the compositions of the present invention when amorphous silica is employed.

Two formulations were prepared as in Example 1 using the silicone resin (1), epoxy resins (2), (3), and (5)

described in Examples 1 and 2. Each formulation employed 10 weight percent resin (1), 3 weight percent resin (5), 73.975 weight percent 325 mesh amorphous silica filler, 0.125 weight percent lampblack, and 0.9 weight percent $Sb_2O_3$. In formulation (a) 3 weight percent epoxy resin (2) and 9 weight percent epoxy resin (3) were also employed. In formulation (b) 12 weight percent of epoxy resin (2) was employed.

To each of these formulations was added 0.83 weight percent Carnauba wax, 0.19 weight percent calcium stearate, and to formulation (a) was added 0.5 weight percent aluminum tribenzoate and to formulation (b) 0.3 weight percent aluminum tribenzoate where the percents indicated are based on the combined weights of resins (1), (2), (3) and (5).

The crack resistance of each formulation was determined by encapsulating 10 watt ceramic resistor cores by molding 2 minutes at 350° F. at 800 p.s.i. Each encapsulated core was post cured 4 hours at 175° C. The devices were subjected to a thermal cycle of 10 minutes at $-65°$ C. followed by 10 minutes at an elevated temperature. The devices were run through 4 cycles using 250° C., plus 1 cycle using 275° C. as the elevated temperature. The devices were examined for cracks after standing 10 days at room temperature. Of the devices molded with formulation (a) containing 80 weight percent based on the combined weight of epoxy resins (2), (3) and (5) of bisphenol and brominated bisphenol based epoxy resins, 83 percent were good devices. None of the devices molded with formulation (b) containing only 12 weight percent of brominated bisphenol based epoxy resin and none of (3) were good devices.

That which is claimed is:

1. An improved curable siloxane-epoxy molding composition which is a blend of
    (A) 5 to 60 weight percent based on the combined weight of (A) and (D) of a phenylpolysiloxane resin having a degree of substitution of from 1.0 to 1.7, a phenyl to silicon ratio of 0.2 to 1.5, an R to silicon ratio of 0.4 to 1.4 in which R is an aliphatic hydrocarbon radical of 1 to 3 carbon atoms, and a silicon-bonded hydroxyl content of from 2.5 to 10.0 weight percent,
    (B) 0.1 to 10 weight percent based on the combined weight of (A) and (D) of an aluminum catalyst selected from the group consisting of aluminum acylates of the formula

in which each R' is independently selected from the group consisting of the hydrogen atom, alkyl radicals containing from 1 to 20 inclusive carbon atoms, and aryl and aryl containing hydrocarbon radicals containing 6 to 24 inclusive carbon atoms and n having a value from 0 to 2, condensates of such compounds,
    (C) 65 to 85 weight percent based on the combined weight of (A), (B), and (D) of a silica filler, wherein the improvement comprises employing as the epoxy ingredient,
    (D) 40 to 95 weight percent based on the combined weight of (A) and (D) of an aromatic polyepoxide resin which has more than one epoxide per molecule, has a Durran's melting point between 60° and 110° C., and is composed of at least 38 weight percent based on the weight of (D) of a polydiglycidyl ether of a bisphenol.

2. A composition in accordance with claim 1 in which the aromatic polyepoxide resin (D) consists essentially of a polydiglycidyl ether of a bisphenol.

3. A composition in accordance with claim 1 in which the aromatic polyepoxide resin (D) is a mixture of 80 to 95 percent by weight of polydiglycidyl ether of bisphenol A and 5 to 20 percent by weight of polydiglycidyl ether of brominated (ring substituted) bisphenol A.

4. A composition in accordance with claim 1 in which the silica filler contains crystalline silica.

5. A method of improving the crack resistance of curable siloxane-epoxy molding compositions which are prepared by blending
    (A) 5 to 60 weight percent based on the combined weight of (A) and (D) of a phenylpolysiloxane resin having a degree of substitution of from 1.0 to 1.7, a phenyl to silicon ratio of 0.2 to 1.5, an R to silicon ratio of 0.4 to 1.4 in which R is an aliphatic hydrocarbon radical of 1 to 3 carbon atoms, and a silicon-bonded hydroxyl content of from 2.5 to 10.0 weight percent,
    (B) 0.1 to 10 weight percent based on the combined weight of (A) and (D) of an aluminum catalyst selected from the group consisting of aluminum acylates of the formula

in which each R' is independently selected from the group consisting of the hydrogen atom, alkyl radicals containing from 1 to 20 inclusive carbon atoms, and aryl and aryl containing hydrocarbon radicals containing 6 to 24 inclusive carbon atoms and n having a value from 0 to 2 and condensates of such compounds,
    (C) 65 to 85 weight percent based on the combined weight of (A), (B) and (D) of a silica filler, wherein the improvement comprises adding to the composition,
    (D) 40 to 95 weight percent based on the combined weight of (A) and (D) of an aromatic polyepoxide resin which has more than one epoxide per molecule, has a Durran's melting point between 60° and 110° C., and is composed of at least 38 weight percent based on the weight of (D) of a polydiglycidyl ether of a bisphenol.

6. The method in accordance with claim 5 wherein the aromatic polyepoxide resin (D) consists essentially of a polydiglycidyl ether of a bisphenol.

7. The method in accordance with claim 5 wherein the aromatic polyepoxide resin is a mixture of 80 to 95 percent by weight of polydiglycidyl ether of bisphenol A and 5 to 20 percent by weight of polydiglycidyl ether of brominated (ring substituted) bisphenol A.

8. The method in accordance with claim 5 wherein the silica filler contains crystalline silica.

* * * * *

UNITED STATES PATENT AND TRADEMARK OFFICE
CERTIFICATE OF CORRECTION

PATENT NO. : 4,202,811
DATED : May 13, 1980
INVENTOR(S) : Keith W. Michael and Alvin L. Moore It is certified that error appears in the above-identified patent and that said Letters Patent are hereby corrected as shown below:

In Column 1, line 64; the portion of the word reading "nor-" should read "ther-".

In Column 2, line 4; the word reading "automatic" should read "aromatic".

In Column 2, line 56; the word reading "acrylates" should read "acylates".

In Column 3, line 65; the word reading "that" should read "than".

In Column 4, line 67; the word reading "Silicon" should read "Silicone".

Signed and Sealed this

Seventeenth Day of November 1S

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,202,811
DATED : May 13, 1980
INVENTOR(S) : KEITH W. MICHAEL and ALVIN L. MOORE It is certified that error appears in the above-identified patent and that said Letters Patent are hereby corrected as shown below:

Column 3, line 1, cancel "(B)" and substitute "(C)".

Column 7, line 31, cancel "12" and substitute "20".

Column 7, line 61, cancel "(B)" and substitute "(C)".

Column 8, line 45, cancel "(B)" and substitute "(C)".

Signed and Sealed this

Fifteenth Day of June 1982

[SEAL]

Attest:

GERALD J. MOSSINGHOFF

Attesting Officer     Commissioner of Patents and Trademarks